(12) United States Patent
Tanaka (10) Patent No.: US 11,440,206 B2
(45) Date of Patent: Sep. 13, 2022

(54) ROBOT DEVICE AND THERMAL DISPLACEMENT AMOUNT ESTIMATION DEVICE

(71) Applicant: FANUC CORPORATION, Yamanashi (JP)

(72) Inventor: Yasuyoshi Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 406 days.

(21) Appl. No.: 16/704,639

(22) Filed: Dec. 5, 2019

(65) Prior Publication Data
US 2020/0230829 A1 Jul. 23, 2020

(30) Foreign Application Priority Data
Jan. 22, 2019 (JP) .............................. JP2019-008423

(51) Int. Cl.
  B25J 19/00 (2006.01)
  B25J 9/16 (2006.01)
  B25J 19/02 (2006.01)

(52) U.S. Cl.
  CPC ......... *B25J 19/0054* (2013.01); *B25J 9/1615* (2013.01); *B25J 9/1692* (2013.01); *B25J 19/0029* (2013.01); *B25J 19/02* (2013.01)

(58) Field of Classification Search
  CPC .... B25J 19/0054; B25J 9/1615; B25J 9/1692; B25J 19/0029; B25J 19/02; B25J 9/1653;
  (Continued)

(56) References Cited

U.S. PATENT DOCUMENTS

2013/0345871 A1* 12/2013 Kimura ................. B25J 9/1694
  700/258
2015/0266183 A1* 9/2015 Alifragkis ............. B25J 9/1692
  700/254
(Continued)

FOREIGN PATENT DOCUMENTS

JP 2004042260 A * 2/2004 ............. B23Q 15/18
JP 2006-289608 A 10/2006
(Continued)

OTHER PUBLICATIONS

JP2015150676.English.translate (Year: 2015).*
(Continued)

*Primary Examiner* — B M M Hannan
(74) *Attorney, Agent, or Firm* — Nakanishi IP Associates, LLC (57) ABSTRACT

A robot device includes an arm mechanism that includes links and joints. A hand is mounted to a tip of the arm. A motor driver drives motors of the joints. A processor outputs, to the motor driver, a command value for moving a reference point of the hand to a target position. A storage device stores a first thermal displacement amount temporal variation representing a variation with respect to a continuous operation time period in a thermal displacement amount by which the hand reference point is displaced from a cool position to a heat balance position due to heat generation accompanying operation of the arm mechanism, and a second thermal displacement amount temporal variation representing a variation with respect to a continuous stopped time period in a thermal displacement amount by which the hand reference point returns from the heat balance position to the cool position accompanying stopping of operation of the arm mechanism. The processor refers to the first and second thermal displacement amount temporal variations to estimate a thermal displacement amount of the hand reference (Continued)

point based on the continuous operation time period and continuous stopped time period of the arm mechanism, and corrects the target position based on the estimated thermal displacement amount.

8 Claims, 10 Drawing Sheets

(58) Field of Classification Search
CPC ...... B25J 9/0009; B25J 9/1628; B25J 13/088; B25J 19/00; G05B 2219/39192
USPC .................................................. 700/250, 254
See application file for complete search history.

(56) References Cited

U.S. PATENT DOCUMENTS

| | | | |
|---|---|---|---|
| 2015/0277426 A1* | 10/2015 | Ogata | G05B 19/404 901/46 |
| 2016/0136812 A1* | 5/2016 | Hosek | B25J 9/104 700/254 |
| 2018/0099422 A1* | 4/2018 | Yoon | B25J 19/06 |
| 2018/0129184 A1* | 5/2018 | Shimodaira | B25J 9/1694 |
| 2018/0181103 A1* | 6/2018 | Mizoguchi | G05B 19/4103 |
| 2018/0194010 A1* | 7/2018 | Huang | G01B 21/042 |
| 2018/0252362 A1* | 9/2018 | Guo | F16N 29/04 |
| 2018/0368929 A1* | 12/2018 | Popovic | A61B 17/00234 |
| 2021/0276125 A1* | 9/2021 | Lu | B23K 26/0884 |

FOREIGN PATENT DOCUMENTS

| | | | |
|---|---|---|---|
| JP | 2015-150676 A | | 8/2015 |
| JP | 2016215316 A | * | 12/2016 |

OTHER PUBLICATIONS

JP2016215316.English.translate (Year: 2016).*
JPH0241879.English.translat (Year: 1990).*
JP2004042260A.for.English.Translate (Year: 2004).*
Office Action issued in Japanese Patent Application No. 2019-008423 dated Mar. 9, 2021, with English Translation (11 pages).

* cited by examiner

```
ACTUALLY MEASURED THERMAL
DISPLACEMENT AMOUNT INPUT SCREEN                                    27

ACTUAL MEASUREMENT TIME PERIOD              ☐ MINS  ☐ SECS
(CONTINUOUS OPERATION TIME PERIOD)

ACTUALLY MEASURED THERMAL DISPLACEMENT AMOUNT (ΔX)  ☐ . ☐ mm

ACTUALLY MEASURED THERMAL DISPLACEMENT AMOUNT (ΔY)  ☐ . ☐ mm

ACTUALLY MEASURED THERMAL DISPLACEMENT AMOUNT (ΔZ)  ☐ . ☐ mm (RESET)  (END)
```

ROBOT DEVICE AND THERMAL DISPLACEMENT AMOUNT ESTIMATION DEVICE

CROSS-REFERENCE TO RELATED APPLICATIONS

This application is based upon and claims the benefit of priority from the Japanese Patent Application No. 2019-008423, filed Jan. 22, 2019, the entire contents of which are incorporated herein by reference.

FIELD

Embodiments of the present invention relate to a robot device and a thermal displacement amount estimation device.

BACKGROUND

After a robot device is activated from a state in which the power of the robot device was switched off, as the operating time elapses, the temperature of an arm mechanism increases due to heat generation by a motor that is a source of power for joints and frictional heat generated by the inner structure of the joints and the like, and thermal deformation occurs at the arm mechanism due to thermal expansion. As a result, the tip point of a hand that is attached to an arm is displaced, and a positional deviation arises with respect to a work. Depending on the application, a displacement of 0.1 mm units may cause a task error, and in such a case a deformation in the arm mechanism that is caused by heat cannot be ignored.

Known methods for estimating a thermal displacement amount with high accuracy include a method that measures the temperature at multiple locations on an arm mechanism using sensors and calculates a thermal displacement amount based on a thermal displacement function that is derived beforehand based on experiment or a structural model or the like, and a method that directly measures a displacement amount of a tip of a hand by means of an optical sensor.

However, in the case of these conventional methods, an increase in cost that accompanies the introduction of sensors and an increase in the number of installation man-hours is unavoidable. In some cases limitations on the installation environment for sensors exist, which prohibits installation of the sensors. Further, in some cases the expected correction accuracy is not obtained due to sensor alignment errors. In addition, during operation, positions at which sensors are installed may become misaligned or an operating fault of a sensor may unexpectedly occur, and in such a case it is necessary to interrupt work operations and request a specialist technician to perform a calibration operation for the purpose of a thermal displacement amount.

SUMMARY

There are needs to achieve thermal displacement correction with high accuracy without using a sensor, and to immediately deal with problems that arise at the work site when some kind of malfunction occurs in correction processing with respect to thermal displacement and a positional deviation occurs, without relying on a specialist robotics technician.

A robot device according to one aspect of the present disclosure includes an arm mechanism having a plurality of links and a plurality of joints connecting the plurality of links. An end effector is mounted to a tip of the arm mechanism. A plurality of motors generate motive power for the plurality of joints. A motor driver drives the motors. A command value outputting section outputs, to the motor driver, command values for each of the joints to move a reference point of the end effector to a target position. A storing section stores data relating to a first and a second thermal displacement amount temporal variation. The first thermal displacement amount temporal variation represents a variation with respect to a continuous operation time period in a thermal displacement amount by which the reference point of the end effector is displaced from a cool position to a heat balance position due to heat generation that occurs due to operation of the arm mechanism. The second thermal displacement amount temporal variation represents a variation with respect to a continuous stopped time period in a thermal displacement amount by which the reference point of the end effector returns from the heat balance position to the cool position accompanying stopping of operation of the arm mechanism. A position correction processing section refers to the first and second thermal displacement amount temporal variations to estimate a thermal displacement amount of the reference point of the end effector based on the continuous operation time period and continuous stopped time period of the arm mechanism, and corrects the target position based on the estimated thermal displacement amount.

According to one aspect, thermal displacement correction can be achieved with high accuracy without using a sensor.

DETAILED DESCRIPTION

Hereinafter, a robot device according to the present embodiment will be described with reference to the accompanying drawings. Note that, as is widely known, various kinds of robot devices exist such as a polar coordinate-type robot, a cylindrical coordinate-type robot, a Cartesian coordinate-type robot, a vertical articulated-type robot, a horizontal articulated-type (scalar-type) robot and a parallel link-type robot, and the present embodiment can be applied to any kind of robot. Here, a vertical articulated-type robot is described as an example.

Figure 1:
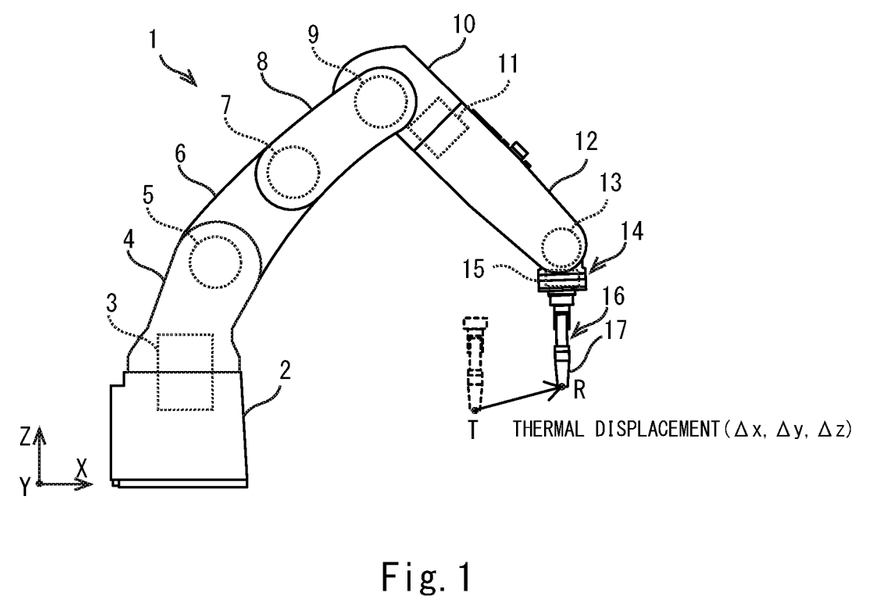
FIG. 1 is an external view of an arm mechanism of a robot device according to the present embodiment.

FIG. 1 illustrates an arm mechanism of the robot device according to the present embodiment. An arm mechanism 1 has a base 2. A link 4 is arranged on the base 2 through a joint 3 for turning. The link 4 and other links 6, 8, 10 and 12 are connected by a plurality of joints 5, 7, 9 and 11. By means of this structure, the arm mechanism 1 is equipped with multiple degrees of freedom. In this example, a hand 16 having a pair of fingers 17 is connected as an end effector to the tip of the link 12 through a wrist section 14. A plurality of joints 13 and 15 for freely setting the direction of the hand 16 are mounted in the wrist section 14. Typically, motion control is performed that takes the center of the grip (a reference point R) of the pair of fingers 17 of the hand 16 as a reference. Although motion control is performed so that the reference point R matches a target position T, the reference point R deviates from the target position T due to thermal deformation of mainly the joints 5, 7, 9 and 11 and the links 4, 6, 8, 10 and 12 that is caused by heat generation that accompanies continuous operation of the arm mechanism 1. The amount of deviation of the reference point R with respect to the target position T is expressed as thermal displacement amounts ($\Delta x$, $\Delta y$, $\Delta z$).

Figure 2:
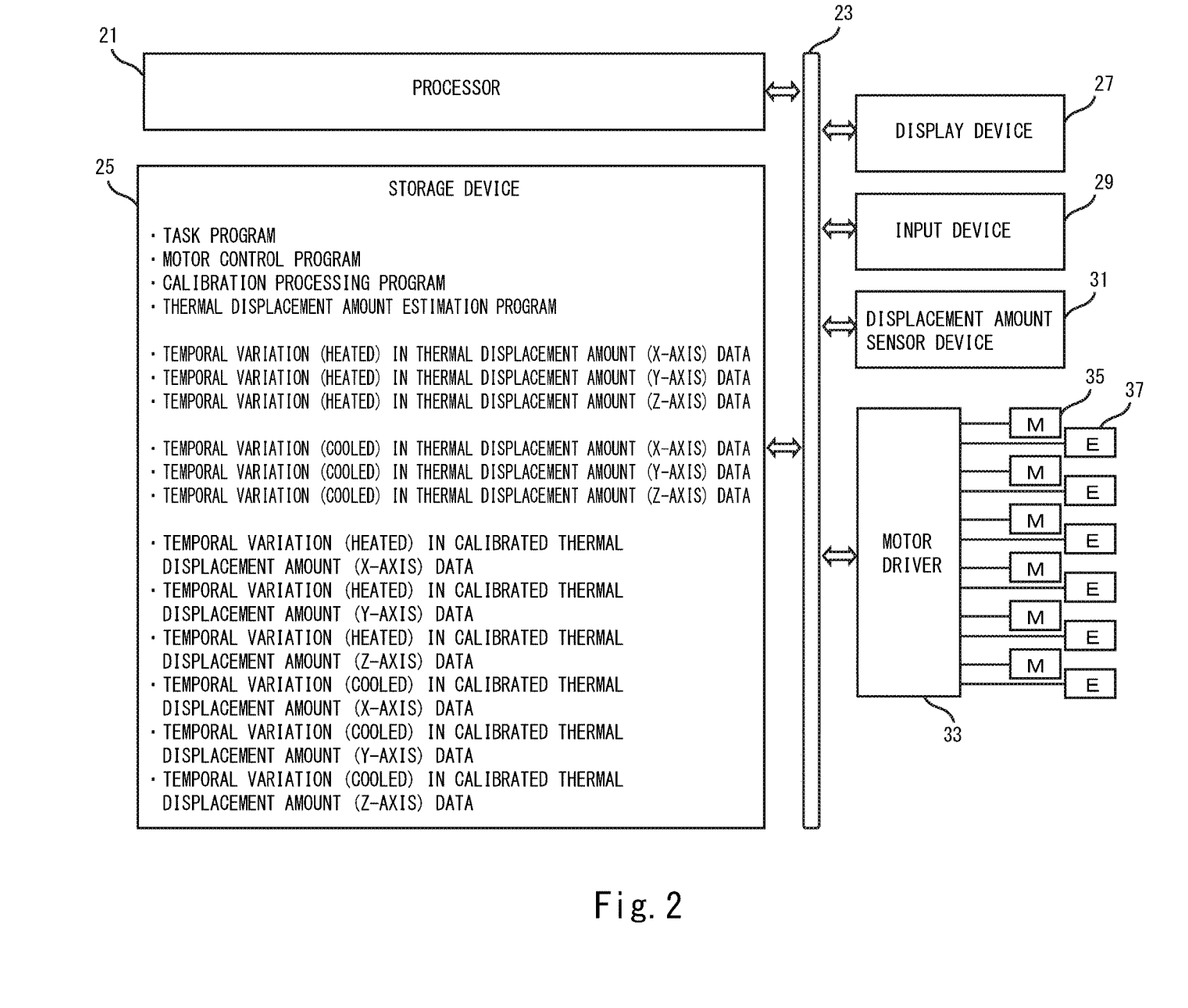
FIG. 2 is a block diagram of a robot device according to the present embodiment.

FIG. 2 illustrates the configuration of the robot device according to the present embodiment by means of a block diagram. A storage device 25, a display device 27, an input device 29 such as a keyboard or a pointing device, a displacement amount sensor device 31, and a motor driver 33 are connected to a processor 21 through a data/control bus 23. A plurality of motors 35 for generating motive power for the aforementioned plurality of joints 3, 5, 7, 9, 11, 13 and 15 are connected along with a rotary encoder 37 to the motor driver 33. The motor driver 33 drives the motors 35 in accordance with a command value (joint angle) from the processor 21. When the processor 21 executes a motor control program that is stored in the storage device 25, the processor 21 functions as a command value outputting section that outputs, to the motor driver 33, command values for each of the joints 3, 5, 7, 9, 11, 13 and 15 for causing the reference point R of the hand 16 to move to the target position T. A task program, a calibration processing program and a position correction processing program that issue instructions for work sequences, movements, conditions and the like that are created by teaching are stored together with the motor control program in the storage device 25. When the processor 21 executes the calibration processing program, the processor 21 functions as a calibration processing section for calibrating a temporal variation in a thermal displacement amount, described later, in accordance with an actually measured value. When the processor 21 executes the position correction processing program, the processor 21 functions as a position correction processing section for estimating a thermal displacement amount of the reference point R of the hand 16 based on a continuous operation time period (an operation duration time) and a continuous stopped time period (a stopped duration time) after activation of the arm mechanism 1 using a temporal variation in the thermal displacement amount that was calibrated, and for also correcting the target position T based on the estimated thermal displacement amount.

Figure 3:
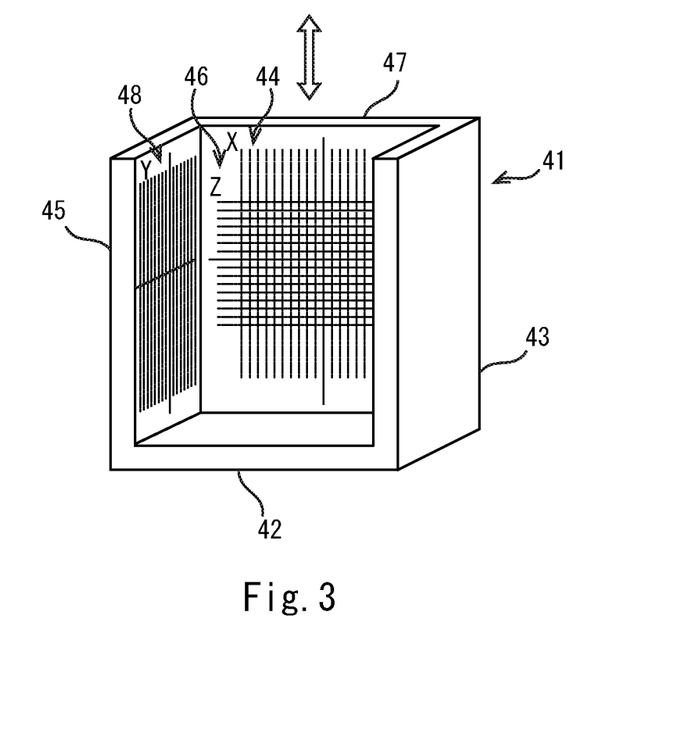
FIG. 3 is a view illustrating a scale for visually measuring a thermal displacement amount of a reference point of a tip of a hand shown in FIG. 1.
Figure 4:
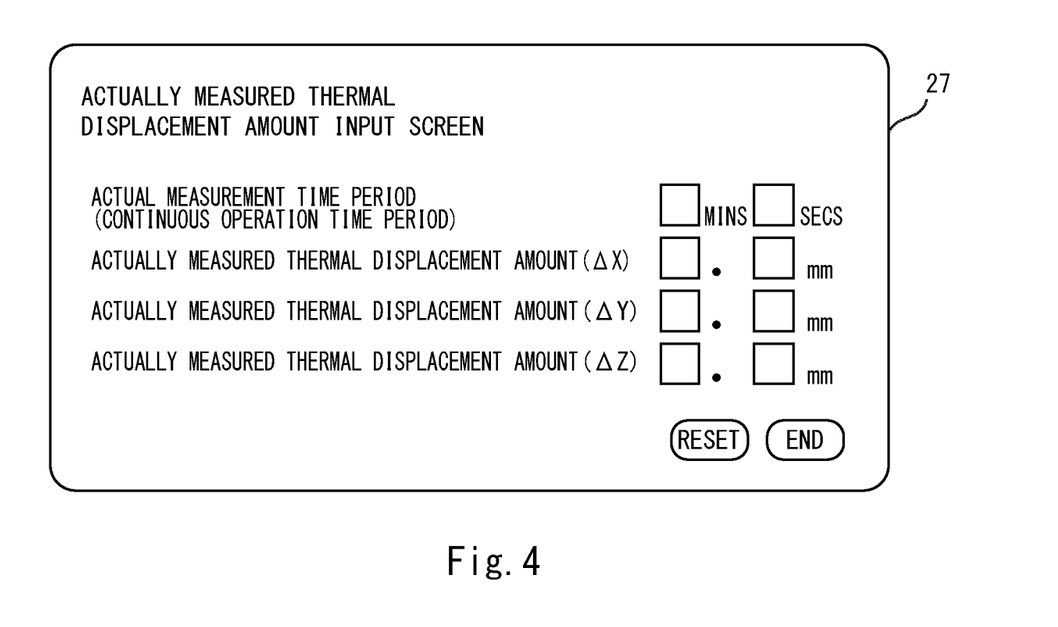
FIG. 4 is a view illustrating an example of an input screen for inputting an actually measured displacement amount that was measured using the scale illustrated in FIG. 3.

FIG. 3 illustrates one example of a scale 41 for visually measuring a thermal displacement amount of the reference point R of the hand 16. The scale 41 is composed of, for example, a base plate 42, and left and right side plates 43 and 45 and a back plate 47 that are erected on the base plate 42, with X, Y and Z graduations 44, 46 and 48 written on the inner face of each of the side plates 43 and 45 and the back plate 47. The scale 41 is applied when measuring a thermal displacement amount, and is detached during operation. When applying the scale 41, the scale center is aligned with the target position T. When measuring a thermal displacement amount, the arm mechanism 1 is operated continuously for a certain time, and the hand 16 is stopped at the control target position T. A worker measures a deviation of the reference point R of the hand 16 with respect to the scale center, that is, thermal displacement amounts ($\Delta x$, $\Delta y$, $\Delta z$) at the measurement time point, by referring to the graduations 44, 46 and 48. The actually measured thermal displacement amounts ($\Delta x$, $\Delta y$, $\Delta z$) are input through the input device 29 on an input screen illustrated in FIG. 4, together with the continuous operation time period of the arm mechanism 1 from the time when the arm mechanism 1 was activated until the thermal displacement amount was measured.

Figure 5A:
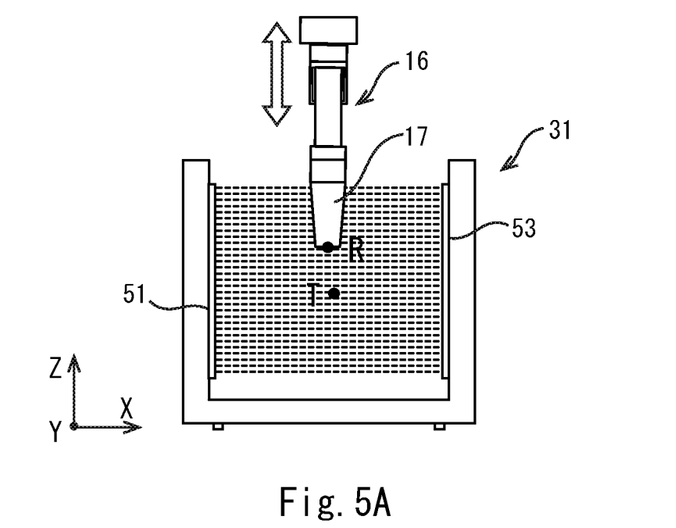
FIGS. 5A and 5B are views illustrating a displacement amount sensor device for visually measuring a thermal displacement amount of a reference point of the tip of the hand illustrated in FIG. 1.
Figure 5B:
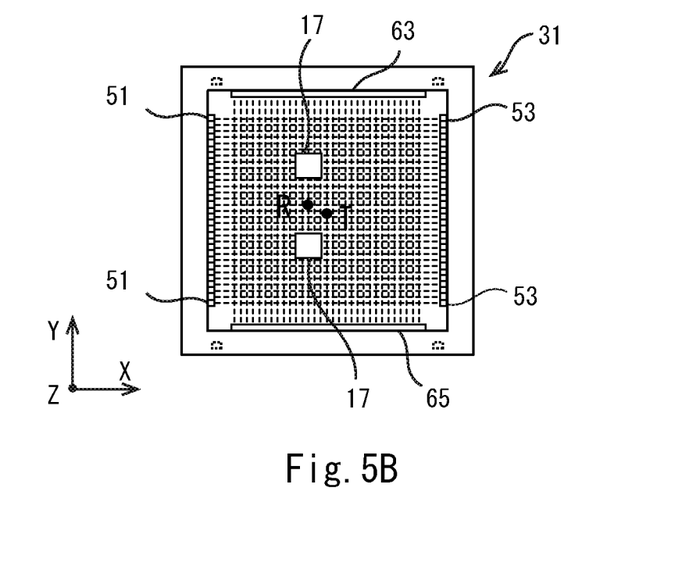

Note that, instead of using the scale 41, the thermal displacement amounts ($\Delta x$, $\Delta y$, $\Delta z$) may be measured using the displacement amount sensor device 31 illustrated in FIG. 5A and FIG. 5B. As the displacement amount sensor device 31, for example, a box body is made in which the ceiling surface is open so that the hand 16 can be inserted therein. A light projecting element array 51 and a light receiving element array 53 of a line sensor are disposed in parallel with the Z-axis and arranged along the Y-axis on the inner side of the box body. Similarly, a light projecting element array 63 and a light receiving element array 65 of a plurality of line sensors are disposed in parallel with the X-axis and arranged along the Y-axis on the inner side of the box body. By means of an image processing program of the processor 21, the contours of the fingers 17 of the hand 16 are extracted from the outputs of these line sensors, the center points thereof are identified, the center between the center points is recognized as the coordinates of a reference position R on the sensor coordinate system, and deviations in three axial directions of the coordinates of the reference position R relative to the origin of the sensor coordinate system that is aligned with the target position in advance are determined as actually measured thermal displacement amounts ($\Delta x$, $\Delta y$, $\Delta z$).

Figure 6A:
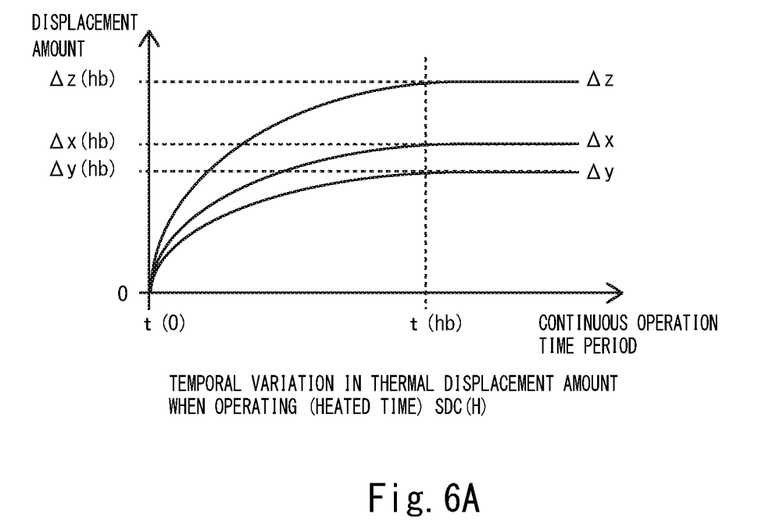
FIGS. 6A and 6B are views illustrating examples of temporal variations in thermal displacement amounts stored in a storage device shown in FIG. 2.
Figure 6B:
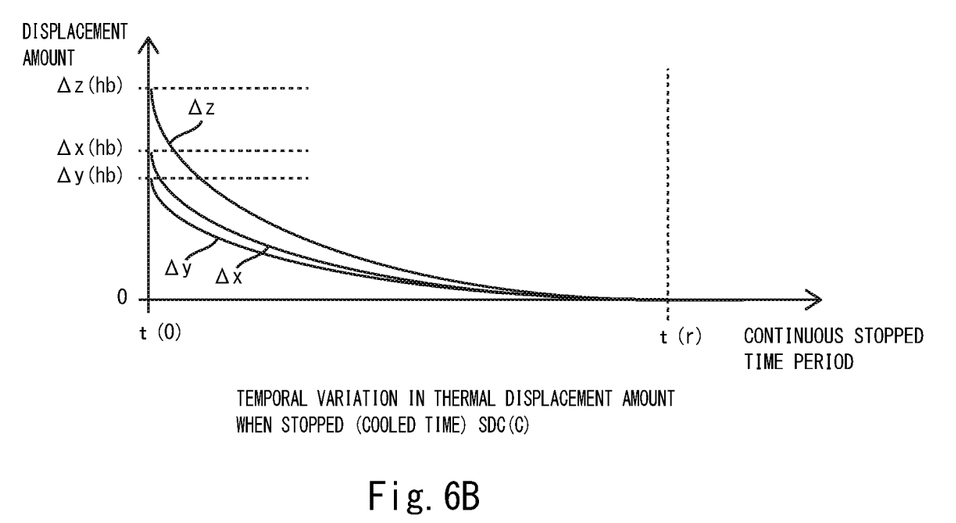

Data relating to a temporal variation in a thermal displacement amount at a heated time and data relating to a temporal variation in a thermal displacement amount at a cooled time is stored for each of the X, Y and Z axes in the storage device 25. As illustrated in FIG. 6A, a temporal variation in a thermal displacement amount at a heated time represents a variation with respect to passage of an operation time period in a thermal displacement amount by which the reference point R of the hand 16 is displaced from a position (cool position) at a time point at which the arm mechanism 1 is cooled at normal temperature to a position (heat balance position) at a time point at which the temperature of the arm mechanism 1 reaches heat balance, due to heat generation that occurs due to operation of the arm mechanism 1. As illustrated in FIG. 6B, a temporal variation in the thermal displacement amount at a cooled time represents a variation with respect to passage of a continuous stopped time period in a thermal displacement amount by which the reference point R of the hand 16 returns from the heat balance position to the cool position accompanying stopping of the operation of the arm mechanism 1.

These temporal variations in the thermal displacement amount may be determined by repeatedly causing the arm mechanism 1 to actually operate according to a reference motion and repeatedly measuring a thermal displacement amount of the reference point R in a reference posture, or may be determined by computational processing based on a thermal distribution model and heat generation model that correspond to the structure of the arm mechanism 1. Preferably, the arm mechanism 1 is caused to repeatedly operate by performing actual movements according to the task program, and not a reference motion and a reference posture, and the thermal displacement amount of the reference point R in a working posture is repeatedly measured.

In this respect, the inventors focused on the fact that the thermal capacity of the arm mechanism 1 is approximately determined depending on the machine type and structure, the fact that a time period from a cool time point until reaching a thermally balanced state (heat balance time period t(hb)) is fixed for each arm mechanism 1, and similarly the fact that a time period until the arm mechanism 1 returns to a cool state from a heat balance state (cooling time period t(r)) is also fixed for each arm mechanism 1. Furthermore, the inventors focused on the fact that a heating value changes according to the operation pattern of the arm mechanism 1, and maximum thermal displacement amounts $\Delta x(hb)$, $\Delta y(hb)$, $\Delta z(hb)$ in the heat balance time period t(hb) also change in accordance therewith.

By taking the stored "temporal variations in thermal displacement amounts at a heated time" as a reference, in a state in which the heat balance time period t(hb) is fixed, the "temporal variations in thermal displacement amounts at a heated time" can be calibrated with high accuracy in correspondence with the inherent thermal capacity of the arm mechanism 1, a heating value in accordance with the operation pattern, and the environmental temperature and the like by enlarging or reducing the "temporal variations in thermal displacement amounts at a heated time" in the displacement direction so as to pass through the thermal displacement amount that was actually measured (actually measured thermal displacement amount) in the continuous operation time period at the time of the actual measurement. Similarly, by taking the stored "temporal variations in thermal displacement amounts at a cooled time" as a reference, in a state in which the cooling time period t(r) is fixed, the "temporal variations in thermal displacement amounts at a cooled time" are likewise calibrated with high accuracy by enlarging or reducing the "temporal variations in thermal displacement amounts at a cooled time" in the displacement direction in such a manner that the thermal displacement amounts (heat balance displacement amounts) in the heat balance state of the calibrated "temporal variations in thermal displacement amounts at a heated time" are adopted as the starting points. Further, since this calibration operation does not require specialist knowledge and it can be carried out by merely performing the simple operation of measuring thermal displacement amounts, when a positional error of the reference point R of the hand 16 occurs, the error can be dealt with immediately at the work site at which the robot device is operating, without needing to rely on a specialist technician.

Figure 7:
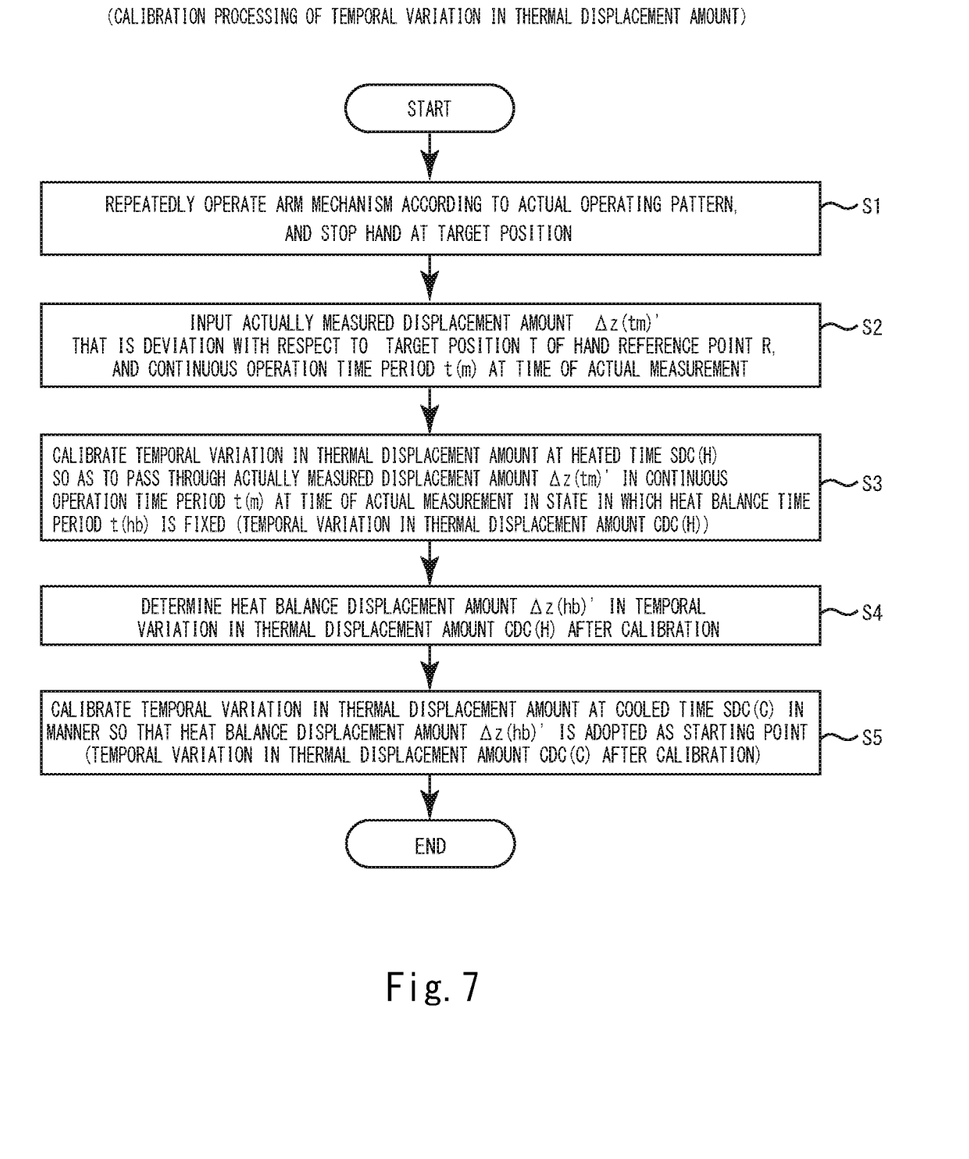
FIG. 7 is a flowchart illustrating calibration processing procedures for calibrating a temporal variation in a thermal displacement amount executed by a processor shown in FIG. 2.
Figure 8A:
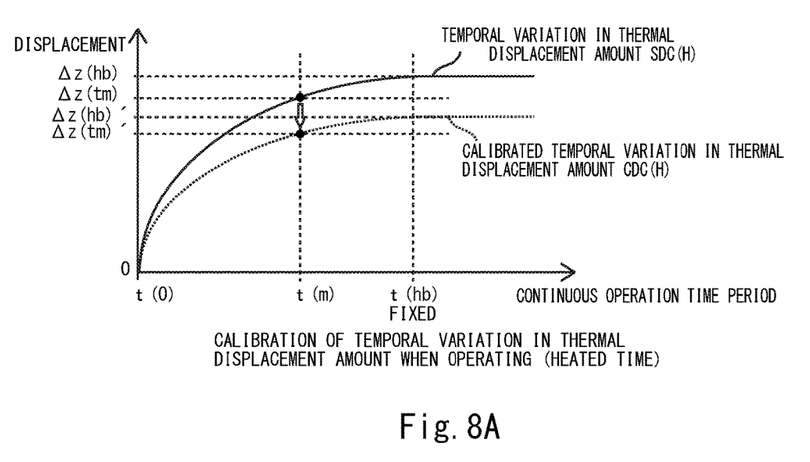
FIGS. 8A and 8B are supplementary explanatory diagrams for describing calibration processing for a temporal variation in a thermal displacement amount in steps S3 and S5 in FIG. 7.

FIG. 7 illustrates calibration processing procedures that are performed according to a calibration processing program. In FIG. 8A, a supplementary explanatory diagram for describing calibration processing of "temporal variations in thermal displacement amounts at a heated time" is illustrated, and in FIG. 8B a supplementary explanatory diagram for describing calibration processing of "temporal variations in thermal displacement amounts at a cooled time" is illustrated. Note that, only calibration processing of a temporal variation in a thermal displacement amount relating to the Z-axis is described here. Calibration processing of temporal variations in thermal displacement amounts relating to the X-axis and the Y-axis is equivalent to the calibration processing for a temporal variation in a thermal displacement amount relating to the Z-axis.

The calibration processing is performed, for example, when introducing a robot device, when updating a task program, and when it is confirmed that some kind of malfunction occurred in correction processing for a thermal displacement correcting. First, the arm mechanism 1 is repeatedly operated according to an actual operation pattern in accordance with the task program, and at an arbitrary time point after a certain amount of time has elapsed, the hand 16 is caused to stop at the control target position T (S1). Naturally, the hand 16 may be caused to stop during execution of an actual task, or operation may be performed and the hand 16 caused to stop for the purpose of calibration processing. The worker utilizes the scale 41 to measure a deviation of the reference point R of the hand 16 relative to the target position T, that is, an actually measured displacement amount $\Delta z(tm)'$. The actually measured displacement amount $\Delta z(tm)'$ is input on the input screen illustrated in FIG. 4 through the input device 29 together with the continuous operation time period t(m) at the time of the actual measurement (S2). In the case of using the displacement amount sensor device 31 instead of the scale 41, manual operations are not required.

A temporal variation in a thermal displacement amount at a heated time SDC(H) is enlarged or reduced in the displacement direction so as to pass through the actually measured displacement amount $\Delta z(tm)'$ in the continuous operation time period t(m) at the time of the actual measurement in a state in which the heat balance time period t(hb) is fixed (S3). As a result, a calibrated temporal variation in the thermal displacement amount at a heated time CDC(H) is generated. Next, a thermal displacement amount $\Delta z(hb)'$ for the heat balance time period t(hb) in the calibrated temporal variation in the thermal displacement amount at a heated time CDC(H) is determined (S4). Data relating to the calibrated temporal variation in the thermal displacement amount at a heated time CDC(H) is stored in the storage device 25.

Figure 8B:
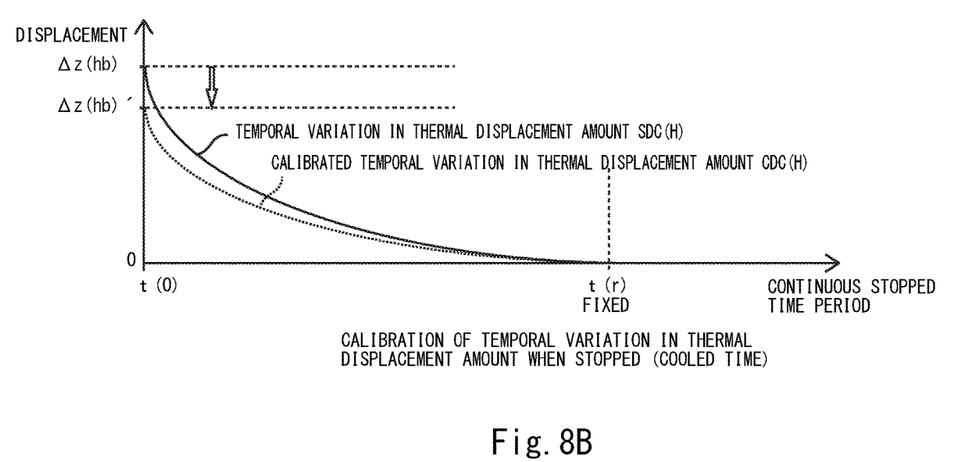

A temporal variation in the thermal displacement amount at a cooled time SDC(C) is enlarged or reduced in the displacement direction in such a manner that the determined heat balance displacement amount $\Delta z(hb)'$ is adopted as the starting point (S5). As a result, a calibrated temporal variation in the thermal displacement amount at a cooled time CDC(C) is generated. Data relating to the calibrated temporal variation in the thermal displacement amount at a cooled time CDC(C) is stored in the storage device 25.

The thermal displacement amount of the reference point R of the hand 16 is repeatedly estimated based on a continuous operation time period and a continuous stopped time period after activation of the arm mechanism 1 that operates in accordance with the task program using the calibrated temporal variation in the thermal displacement amount at a heated time CDC(H) and the calibrated temporal variation in the thermal displacement amount at a cooled time CDC(C), and the target position is repeatedly corrected based on the estimated thermal displacement amount.

Figure 9:
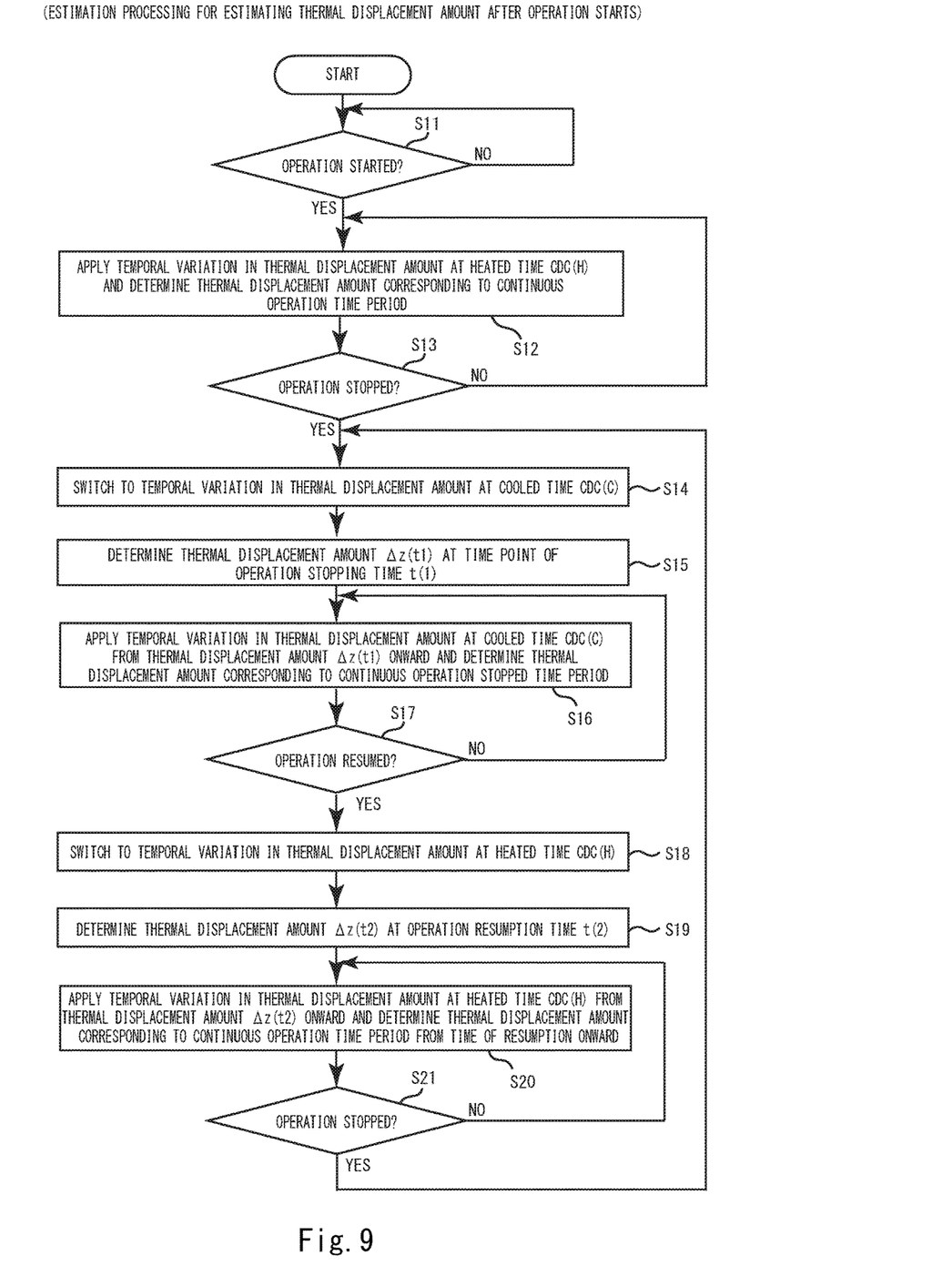
FIG. 9 is a flowchart illustrating estimation processing procedures for estimating a thermal displacement amount executed by the processor shown in FIG. 2.
Figure 10:
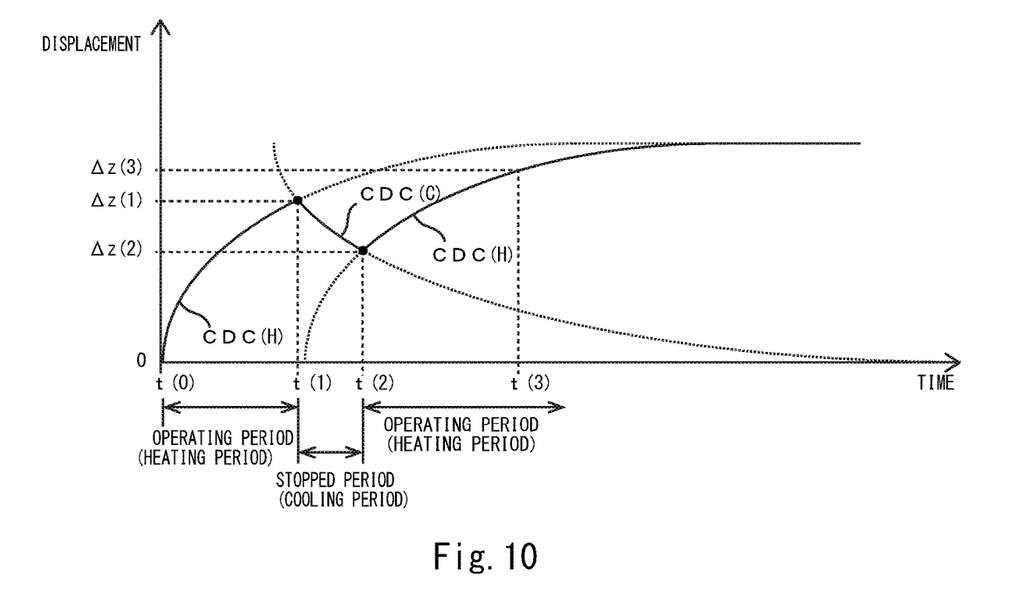
FIG. 10 is a supplementary explanatory diagram for describing the estimation processing for estimating a thermal displacement amount in FIG. 9.

FIG. 9 illustrates estimation processing procedures for estimating a thermal displacement amount of the reference point R of the hand 16. FIG. 10 illustrates a supplementary explanatory diagram for describing estimation processing for estimating a thermal displacement amount. Note that, only estimation processing for estimating a thermal displacement amount relating to the Z-axis is described here. Estimation processing for estimating thermal displacement amounts relating to the X-axis and the Y-axis is equivalent to the estimation processing for estimating a thermal displacement amount relating to the Z-axis.

When the arm mechanism 1 start operation in accordance with the task program (step S11, YES), a continuous operation time period from an operation start time t(0) onward is measured. The "temporal variation in the thermal displacement amount at a heated time CDC(H)" is initially applied as the reference object for the thermal displacement amount estimation processing, and a thermal displacement amount corresponding to a time point at which the measured continuous operation time period from the operation start time t(0) elapsed is determined (step S12). Step S12 in which a thermal displacement amount $\Delta z$ is determined by referring to the "temporal variation in the thermal displacement amount at a heated time CDC(H)" is repeated until operation of the arm mechanism 1 is stopped (step S13).

When operation of the arm mechanism 1 is stopped for some reason (step S13, YES), the reference object for the thermal displacement amount estimation processing is switched from the "temporal variation in the thermal displacement amount at a heated time CDC(H)" to the "temporal variation in the thermal displacement amount at a cooled time CDC(C)" (step S14), and a thermal displacement amount $\Delta z(1)$ at the time point of an operation stopping time t(1) is determined (step S15). A continuous stopped time period from the operation stopping time t(1) onward is measured.

A time point that indicates the thermal displacement amount $\Delta z(1)$ at the operation stopping time t(1) based on the "temporal variation in the thermal displacement amount at a cooled time CDC(C)" is adopted as a starting point, and a thermal displacement amount $\Delta z$ at a time point at which the continuous stopped time period elapsed after operation stopped relative to the starting point is determined by referring to the "temporal variation in the thermal displacement amount at a cooled time CDC(C)" (step S16). Step S16 in which a thermal displacement amount $\Delta z$ is determined by referring to the "temporal variation in the thermal displacement amount at a cooled time CDC(C)" is repeated until operation of the arm mechanism 1 is resumed (step S17).

When operation of the arm mechanism 1 is resumed (step S17, YES), the reference object for the thermal displacement amount estimation processing is switched from the "temporal variation in the thermal displacement amount at a cooled time CDC(C)" to the "temporal variation in the thermal displacement amount at a heated time CDC(H)" (step S18), and a thermal displacement amount $\Delta z(2)$ at the time point of an operation resumption time t(2) is determined (step S19). A continuous operation time period from the operation resumption time t(2) onward is measured.

A time point that indicates the thermal displacement amount $\Delta z(2)$ at the operation resumption time t(2) based on the "temporal variation in the thermal displacement amount at a heated time CDC(H)" is adopted as a starting point, and a thermal displacement amount $\Delta z$ at a time point at which the continuous operation time period from the time when operations resumed elapsed relative to the starting point is determined by referring to the "temporal variation in the thermal displacement amount at a heated time CDC(H)" (step S20). Step S20 in which the thermal displacement amount $\Delta z$ is determined by referring to the "temporal variation in the thermal displacement amount at a heated time CDC(H)" is repeated until operation of the arm mechanism 1 is stopped (step S21).

When operation of the arm mechanism 1 is stopped (step S21, YES), the processing returns to step S14 and the processing from steps S14 to S21 is repeated until operation of the arm mechanism 1 ends.

Figure 11:
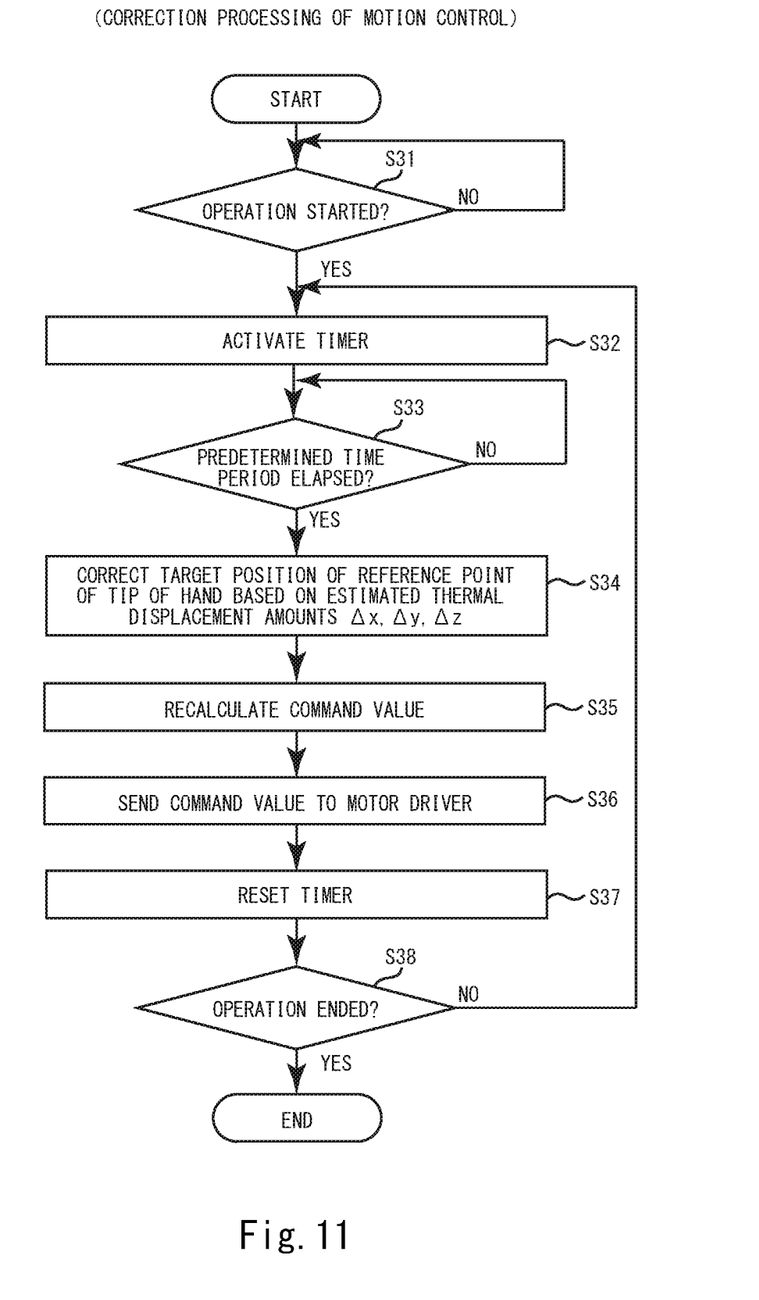
FIG. 11 is a flowchart illustrating correction processing procedures for a thermal displacement amount correcting executed by the processor shown in FIG. 2.

FIG. 11 illustrates correction processing procedures performed according to a thermal displacement amount estimated by the thermal displacement amount estimation processing. The correction processing is repeatedly executed at intervals of a predetermined time period. Therefore, accompanying the start of operation (step S31, YES), a timer is activated (step S32), and at a time point at which a predetermined time period has elapsed (step S33, YES), the target position T of the motor control program is corrected based on thermal displacement amounts $\Delta x$, $\Delta y$ and $\Delta z$ estimated by the thermal displacement amount estimation processing at that time point (step S34), command values (joint angles) of the joints 3, 5, 7, 9, 13 and 15 are recalculated in accordance with the corrected target position T (step S35), and the recalculated command values are sent to the motor driver (step S36). The timer is then reset (step S37). Steps S32 to S37 are repeated until operation ends (step S38, YES). The correction processing is repeatedly executed at fixed time intervals in this manner, and a configuration may be adopted so as to vary the correction processing cycle so that the correction processing cycle is shortened in an initial heating period or an initial cooling period in which variations in thermal displacement amounts are large and the correction processing cycle is lengthened in a period in which variations in the thermal displacement amounts are small. Further, a configuration may be adopted that halts the correction processing from a time when a heat balance state is reached until operation stops, or until operation is resumed after the arm mechanism 1 returned to a cool state.

As described above, according to the present embodiment, thermal displacement correction can be achieved with high accuracy without using a sensor, and furthermore, when a task program is updated or when some kind of malfunction occurs in correction processing with respect to thermal displacement, the problem or the like can be immediately dealt with at the work site where the robot device is operating, without relying on a specialist worker.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A robot device, comprising:
an arm mechanism having a plurality of links and a plurality of joints connecting the plurality of links;
an end effector mounted to a tip of the arm mechanism;

a plurality of motors each of which generates motive power for each of the plurality of joints;

a motor driver that drives the motors;

a processor that outputs, to the motor driver, command values for each of the joints to move a reference point of the end effector to a target position; and a storage device that stores data relating to a first thermal displacement amount temporal variation that represents a variation with respect to a continuous operation time period in a thermal displacement amount by which the reference point of the end effector is displaced from a cool position to a heat balance position due to heat generation that occurs due to operation of the arm mechanism, and data relating to a second thermal displacement amount temporal variation that represents a variation with respect to a continuous stopped time period in a thermal displacement amount by which the reference point of the end effector returns from the heat balance position to the cool position accompanying stopping of operation of the arm mechanism;

wherein the processor refers to the first and second thermal displacement amount temporal variations to estimate a thermal displacement amount of the reference point of the end effector based on the continuous operation time period after activation of the arm mechanism and a continuous stopped time period, and corrects the target position based on the estimated thermal displacement amount.

2. The robot device according to claim 1, wherein the processor initially refers to the first thermal displacement amount temporal variation to estimate the thermal displacement amount based on the continuous operation time period after activation of the arm mechanism, and when operation of the arm mechanism stops, the processor witches a reference object from the first thermal displacement amount temporal variation to the second thermal displacement amount temporal variation and refers to the second thermal displacement amount temporal variation to estimate the thermal displacement amount based on a continuous stopped time period, and when operation of the arm mechanism resumes, the processor switches the reference object from the second thermal displacement amount temporal variation to the first thermal displacement amount temporal variation and refers to the first thermal displacement amount temporal variation to estimate the thermal displacement amount based on a continuous operation time period after operation resumes.

3. The robot device according to claim 1, wherein the processor calibrates the first thermal displacement amount temporal variation based on an actually measured thermal displacement amount of the reference point of the end effector and a continuous operation time period of the arm mechanism at a time of actual measurement, and calibrates the second thermal displacement amount temporal variation based on the calibrated first thermal displacement amount temporal variation.

4. The robot device according to claim 3, wherein the processor calibrates the first thermal displacement amount temporal variation so as to pass through the actually measured thermal displacement amount at the time of the actual measurement in the continuous operation time period while a heat balance time period from the cool position to the heat balance position is fixed, and calibrates the second thermal displacement amount temporal variation in such a manner that a heat balance displacement amount in the calibrated first thermal displacement amount temporal variation is adopted as a starting point.

5. The robot device according to claim 1, further comprising a scale for visually measuring a thermal displacement amount of the reference point of the end effector.

6. The robot device according to claim 1, further comprising a sensor device for optically measuring a thermal displacement amount of the reference point of the end effector.

7. A robot device, comprising:

an arm mechanism having a plurality of links and a plurality of joints connecting the plurality of links;

an end effector mounted to a tip of the arm mechanism;

a plurality of motors each of which generates motive power for each of the plurality of joints;

a motor driver that drives the motors;

a processor that outputs, to the motor driver, command values for each of the joints to move a reference point of the end effector to a target position; and a storage device that stores data relating to a thermal displacement amount temporal variation that represents a variation with respect to a continuous operation time period and a continuous stopped time period in a thermal displacement amount by which the reference point of the end effector is displaced between a cool position and a heat balance position due to heat generation that occurs due to operation of the arm mechanism and cooling that occurs due to stop of the arm mechanism, wherein the processor refers to the thermal displacement amount temporal variation to estimate a thermal displacement amount of the reference point of the end effector based on the continuous operation time period and the continuous stopped time period, and corrects the target position based on the estimated thermal displacement amount.

8. A robot device that estimates a thermal displacement amount by which a reference point of an end effector mounted to a tip of an arm mechanism is displaced from a cool position to a heat balance position due to heat generation that occurs due to operation of the arm mechanism, comprising:

a storage device that stores data relating to a first thermal displacement amount temporal variation that represents a variation with respect to a continuous operation time period of the arm mechanism in a thermal displacement amount by which the reference point of the end effector is displaced from the cool position to the heat balance position, and data relating to a second thermal displacement amount temporal variation that represents a variation with respect to a continuous stopped time period in a thermal displacement amount by which the reference point of the end effector returns from the heat balance position to the cool position accompanying stopping of operation of the arm mechanism;

a sensor device for optically measuring a thermal displacement amount of the reference point of the end effector; and a processor, wherein the processor refers to the first and second thermal displacement amount temporal variations to estimate a thermal displacement amount of the reference point of the end effector based on the continuous operation time period after activation of the arm mechanism and a continuous stopped time period.

* * * * *